S. D. CARNES.
AUTOMOBILE SIGNAL.
APPLICATION FILED AUG. 22, 1919.
1,351,283.
Patented Aug. 31, 1920.
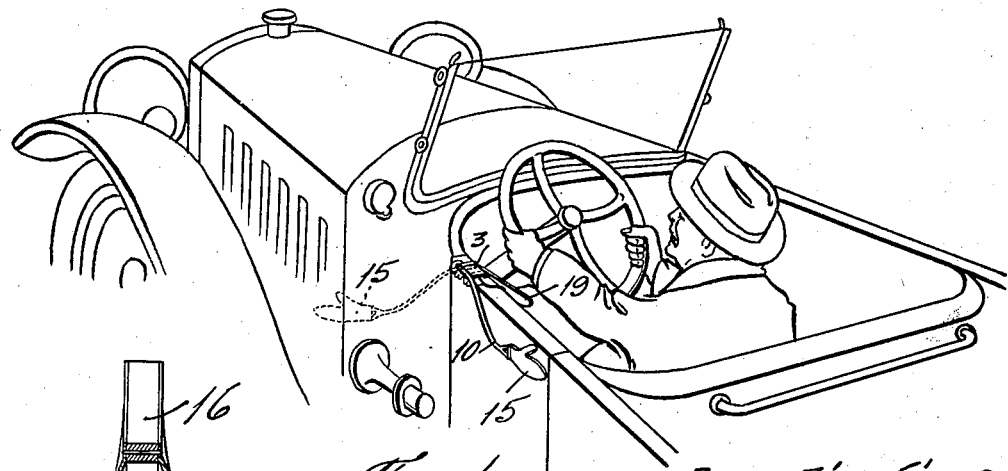
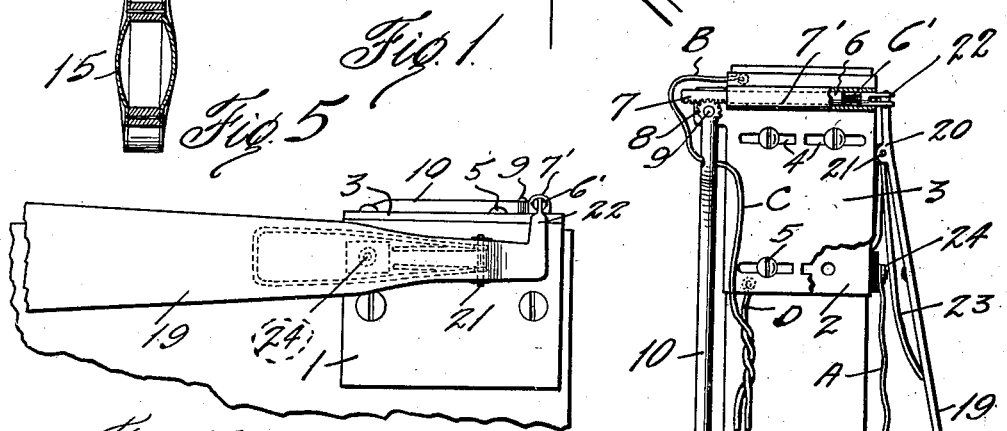
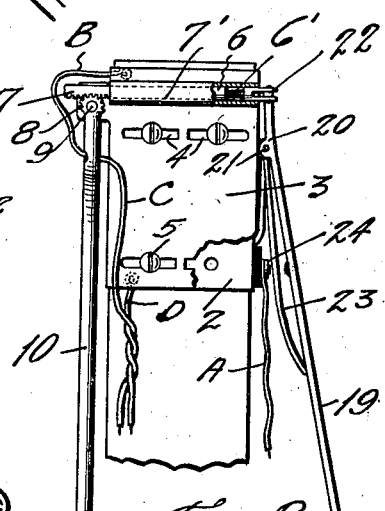
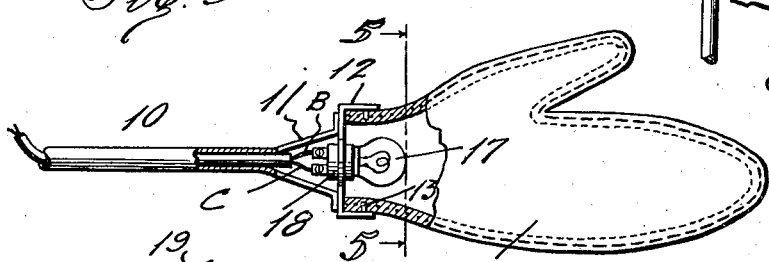
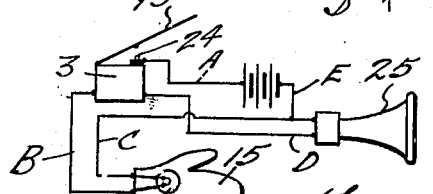
Inventor
S. D. Carnes
By Jack N. Athley
Attorney

UNITED STATES PATENT OFFICE.

SAM D. CARNES, OF FORT WORTH, TEXAS.

AUTOMOBILE-SIGNAL.

1,351,283.  Specification of Letters Patent.  Patented Aug. 31, 1920.

Application filed August 22, 1919. Serial No. 319,100.

*To all whom it may concern:*

Be it known that I, SAM D. CARNES, a citizen of the United States, residing at Fort Worth, in the county of Tarrant and State of Texas, have invented certain new and useful Improvements in Automobile-Signals, of which the following is a specification.

This invention relates to new and useful improvements in automobile direction signals.

The object of the invention is to provide a signal device which may be mounted on the door or edge of an automobile body and connected with the horn so as to sound the same when operated. The idea being to employ an arm arranged to swing outward to indicate a turn and carrying a translucent hand having means for illuminating it. The device being arranged with an operating member located so as to be operated by the knee or elbow of the driver.

The invention will be more readily understood from a reading of the following specification and by reference to the accompanying drawings, in which an example of the invention is shown, and wherein:

Figure 1 is a perspective view of the front end of an automobile showing my signal attached thereto, Fig. 2 is a plan view showing the signal in detail, Fig. 3 is an elevation showing the operating means, Fig. 4 is a detail of the signal hand, Fig. 5 is a cross-sectional view on the line 5—5 of Fig. 4, and Fig. 6 is a diagrammatic view of the complete apparatus.

In the drawing the numeral 1 designates an angular metal plate fastened to the inner side of the door of an automobile and having its outwardly directed portion 2 resting on the top edge of the door or the edge of the body in case the door is not used. A mounting plate 3 having slots 4 is disposed on the plate 2 and held by screws 5 passing through the slots and entering the plate 2. By reason of the slots the plate 3 may be adjusted inwardly or outwardly. A plunger 6 slides in a housing 7' on the plate 3 and carries a gear rack 7 at its outer end.

The gear rack is engaged with a gear boss 8 pivoted on a post 9 extending upward from the plate 3 and overhanging the outer side of the door. A bent arm 10 is integral with the boss and has its outer end 11 forked and secured to a bracket 12. The bracket 12 carries inwardly directed studs 13. A signal hand 15 is received in the bracket and fastened by the studs.

The hand has its sides formed of translucent material which may be covered and which is bowed as shown in Fig. 5. The sides of the hand are spaced apart and secured to a flexible strip 16 conformed to the contour of the hand. This strip may be formed of leather and the hand may be easily removed from or inserted in the bracket by simply compressing its inner end. A small electric lamp 17 is mounted in a socket 18 carried by the bracket 12. This lamp projects into the hand and illuminates the same.

An operating pedal 19 has ears 20 a short distance from its forward end and these ears are pivoted on a pin 21 carried by the plate 1. The pedal has an upstanding lug 22 at its forward end which is pivoted to the inner end of the plunger 6. A spring 23 coiled about the pin 21 has one end bearing against the plate 1 and the other end bearing against the inner side of the pedal so as to normally hold the rear end outward.

When the pedal is depressed toward the side of the car its forward end is swung inward whereby the plunger 6 is pulled inward. When the plunger is moved inward the gear rack 7 revolves the boss 8 whereby the arm 10 is swung outward as is shown in dotted lines in Fig. 1. The spring 23 is compressed when the pedal is swung inward so that when pressure is relieved on the pedal the spring will swing the latter away from the side of the car, thus returning the plunger and arm to their normal position.

A contact terminal 24 is insulated from the plate 1 and projects so as to be engaged by the pedal when the latter is fully depressed. As will be seen from Fig. 6 a circuit wire A leads from the terminal 24 to a battery or other source of electric current supply. A circuit wire B having one end connected between the plates 2 and 3 leads through the arm 10 to the socket 18 of lamp 17. A second circuit wire C leads back through the arm 10 to the horn 25. A circuit wire D has one end connected between the plates and the other end connected with the horn 25. The wire C has connection with the battery or other source of supply by the wire E.

It will be seen that when the driver wishes to turn he merely presses his knee or elbow against the pedal 19 and depresses the latter, whereby the plunger 6 is pulled inward and the arm 10 swung outward at substantially right angles. When the parts reach this position the pedal will engage with the contact 24 so that the electric current will flow through the pedal and over the plates 1, 2 and 3. The circuit to the lamp 17 will be closed over the wires B and C, and the circuit of the horn will be closed over the wires C, D and E. Thus when the hand 15 is swung outward the lamp will be lighted, thus illuminating the translucent hand and operating the horn. This carries a visual as well as an audible signal, and the illuminated colored hand will be easily visible.

Various changes may be made in the arrangement and location of the parts, and modifications may be made within the scope of the claims.

The plunger 6 includes an adjustable yoke 6' which may be disconnected from the lug 22 and the length of the plunger adjusted in accordance with the adjustment of the plate 3.

What I claim, is:

1. In an automobile direction signal, a plate to be fastened to the inner side of the door of an automobile or the like, and carrying an upper horizontal portion, a second plate arranged upon the upper horizontal portion and provided with elongated slots extending transversely of the second plate, clamping elements carried by the upper horizontal portion and operating within the elongated slots, a housing secured upon the second plate and extending transversely thereof, a plunger slidable within the housing and provided at its outer end with a gear rack, a signal arm pivotally connected with the second plate and provided near its pivot with a gear engaging the gear rack, a pedal arranged near and inwardly of the first named plate, means pivotally connecting the pedal and first named plate and spaced from the forward end of the pedal, means connecting the forward end of the pedal and the inner end of the plunger, and a spring to swing the rear end of the pedal outwardly.

2. In an automobile direction signal, a substantially horizontal plate to be secured to the top of an automobile door or the like, a housing arranged upon the plate and extending transversely thereof, a plunger slidable within the housing and provided at its outer end with a gear rack, a horizontally swinging arm pivotally connected with said plate and provided at its pivot with a gear engaging the gear rack, a horizontally swinging pedal arranged upon the inner side of the plate and pivotally connected therewith and pivotally connected with the inner end of the plunger, and a spring arranged inwardly of the pedal and serving to swing its rear end inwardly.

3. In an automobile direction signal, an inverted L-shaped support including horizontal and vertical portions for arrangement upon an automobile body, a housing disposed upon the horizontal portion and secured thereto, a plunger slidable within the housing and provided at its outer end with a gear rack, a horizontally turning gear pivoted upon said horizontal portion and engaging the gear rack, a horizontally swinging signal arm carried by the gear, a horizontally swinging pedal arranged upon the inner side of said vertical portion and having a pair of outwardly projecting knuckles spaced from its forward ends, a substantially vertical pin carried by said vertical portion and pivotally supporting said knuckles, a spring having a portion thereof coiled about the pin and its ends engaging said vertical portion and the pedal, and means pivotally connecting the forward end of the pedal and the plunger.

In testimony whereof I affix my signature.

SAM D. CARNES.